United States Patent [19]

Levine et al.

[11] Patent Number: 4,605,289
[45] Date of Patent: Aug. 12, 1986

[54] BICYCLE MIRROR ASSEMBLY

[75] Inventors: Edward H. Levine; F. E. Dixon Newbold, both of Providence, R.I.

[73] Assignee: Rhode Gear USA, Providence, R.I.

[21] Appl. No.: 658,181

[22] Filed: Oct. 5, 1984

[51] Int. Cl.$^4$ .............................................. G02B 7/18
[52] U.S. Cl. ..................... 350/606; 350/632; 248/487; 74/551.8
[58] Field of Search ............... 350/606, 632, 638, 631; 248/479, 478, 487, 477, 467, 293, 205.2; 74/551.8

[56] References Cited

U.S. PATENT DOCUMENTS 4,054,375 10/1977 Ribeca ................................. 350/632
4,380,369 4/1983 Schacht ............................... 248/487
4,433,899 2/1984 Sellet et al. ........................ 350/606

Primary Examiner—Jon W. Henry
Attorney, Agent, or Firm—Wolf, Greenfield & Sacks

[57] ABSTRACT

A mirror assembly adaptable for use on bicycles having either drop handlebars or upright handlebars. The mirror assembly includes a rigid arm which is preferably bent at an angle between its ends to form a first member at its proximal end and a second member at its distal end, the arm having a rigid hook extending adjacent from the proximal end which is positionable around either a brake lever stem on drop handlebars or a handgrip on upright handlebars. A mirror is pivotally attached to the distal end of the arm. The mirror is mounted on the distal side of the arm when the hook is mounted over the brake lever stem on drop handlebars and the mirror is disposed on the proximal side of the arm when the hook is disposed under the handgrip of upright handlebars. The hook is preferably removably attached to either the brake lever stem or the handgrip by a flexible strap assembly which wraps around the hook and its support. The strap assembly includes a flexible strap having a ring disposed on one end of the strap and securing means such as Velcro attachment means.

16 Claims, 8 Drawing Figures

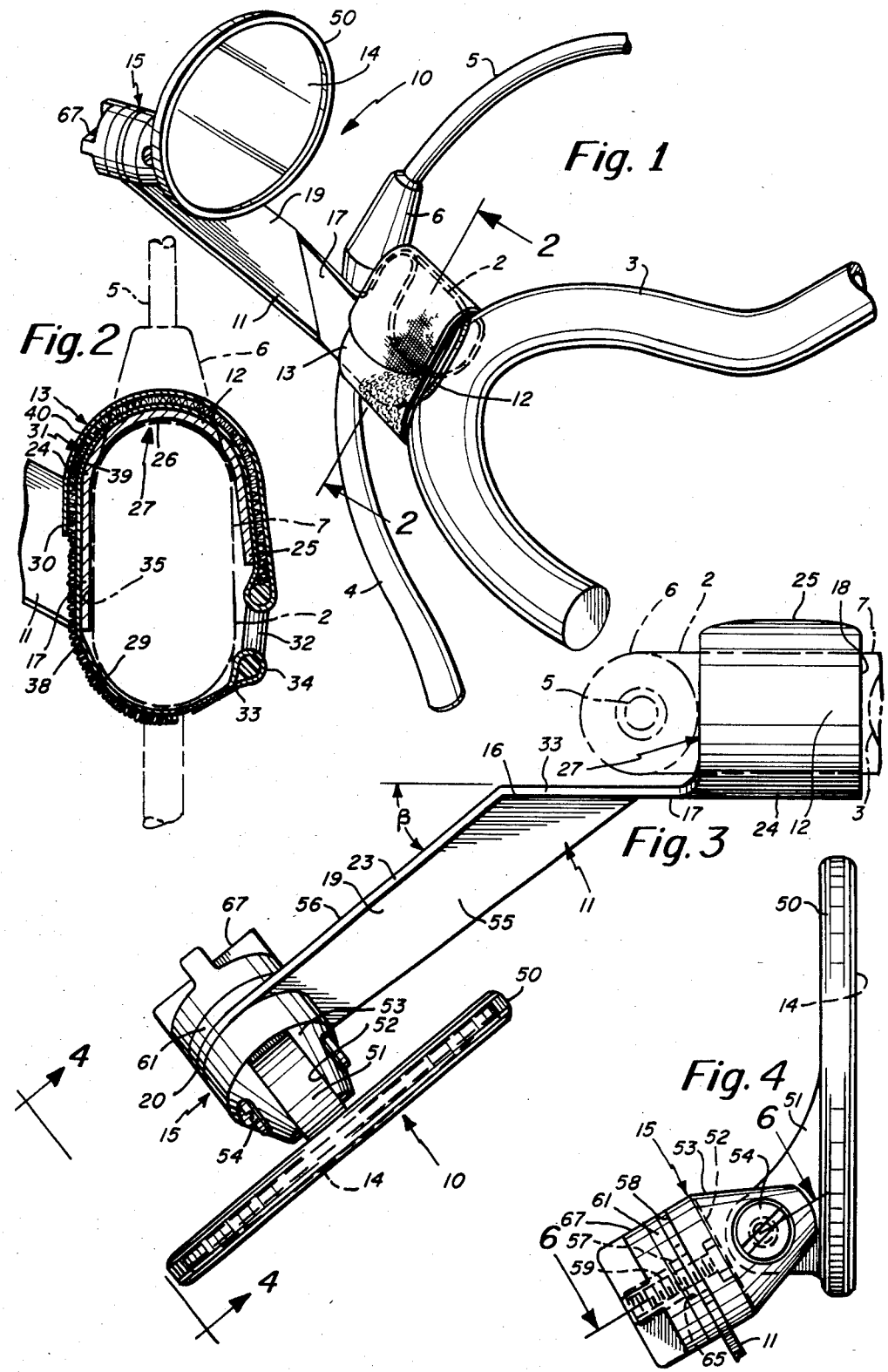

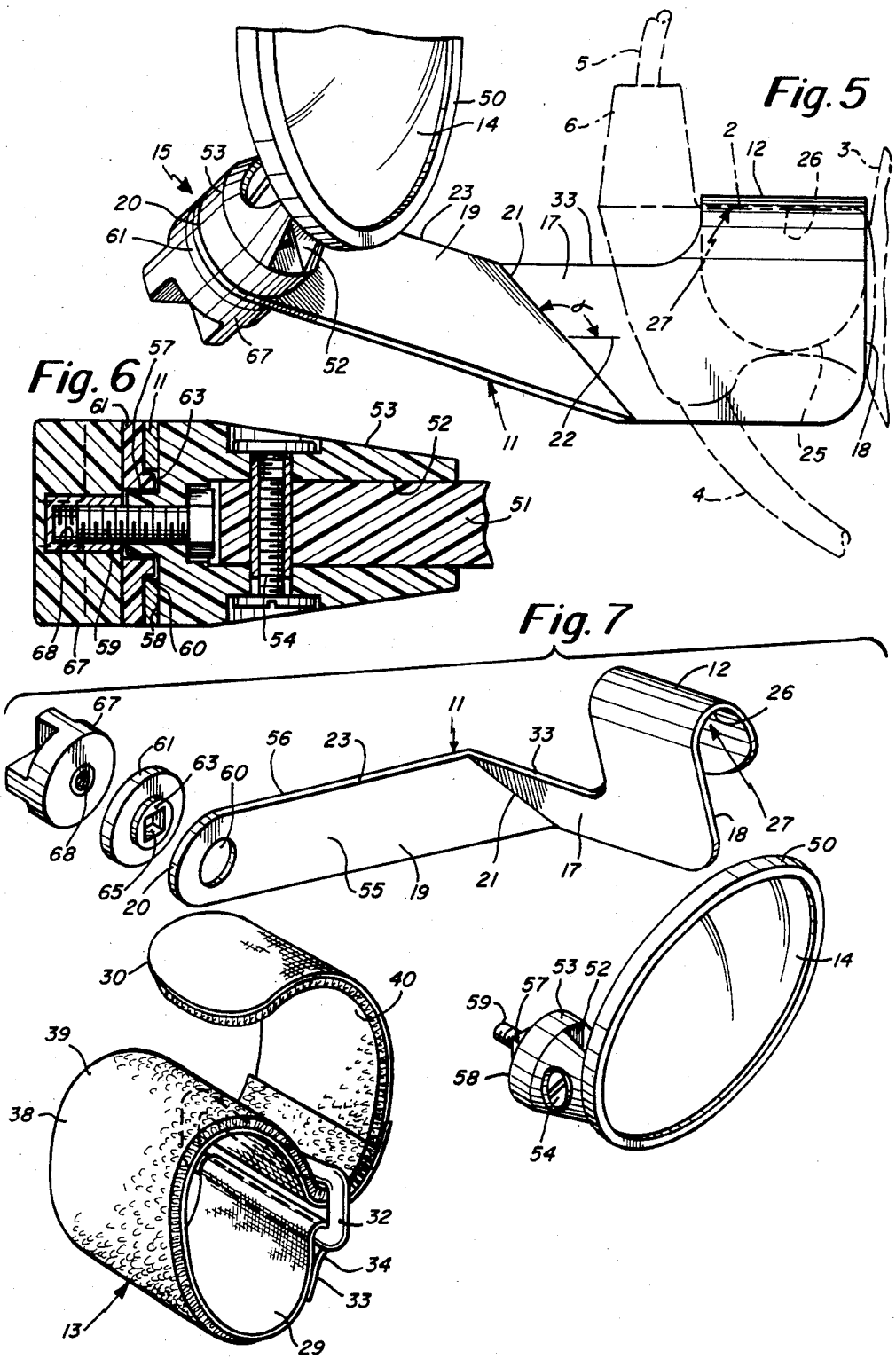

4,605,289

BICYCLE MIRROR ASSEMBLY

FIELD OF THE INVENTION

This invention relates to an adjustable mirror assembly for use on a bicycle or the like.

BACKGROUND OF THE INVENTION

Bicycle mirrors are typically attached to a bicycle by means of metal clamps and/or elongated support members which are screwed onto various positions on the bicycle frame or handlebars. Ordinarily, attachment of such mirrors requires extensive time and correct tools. Further, metal clamps ordinarily used are likely to damage the finish on a bicycle and become rusted which makes removal of the mirror a problem. Also, due to the ever-increasing theft rate for bicycles and bicycle parts, the design of a bicycle mirror which may be quickly removed when the rider leaves the bicycle unattended is desirable.

SUMMARY OF THE INVENTION

It is an object of the present invention to provide an adjustable mirror assembly which can be securily attached to a bicycle so that it will not vibrate or come free when traveling over a bumpy road.

Another object is to provide a quick-release mirror assembly for a bicycle which may be quickly attached and unattached without the use of tools or damaging clamps.

Still another object is to provide such an adjustable bicycle mirror adaptable for use on both drop handlebars and upright handlebars.

In one embodiment of the invention, the mirror assembly includes a rigid arm having a rigid hook adjacent its proximal end and a mirror adjacent its distal end. The hook is positionable around a bicycle brake lever stem on drop handlebars or a handgrip on upright handlebars. Means are provided for attaching the hook to the stem or handgrip. Preferably, the rigid arm is bent at an angle between its ends, forming a first member adjacent the proximal end which is positionable parallel to the brake lever stem or handgrip, and a second member adjacent the distal end which extends in a direction away from the hook. The mirror is mountable on either side of the arm to permit use of the mirror assembly on both drop handlebars and upright handlebars. For use on drop handlebars, the mirror is mounted adjacent the distal side of the arm and the hook extends adjacent the proximal side of the arm for attachment over the stem of the brake lever. For use on upright handlebars, the mirror is mounted on the proximal side of the arm and the hook extends adjacent the proximal side of the arm for attachment under the handgrip. Preferably, the mirror is pivotally mounted on the arm to permit adjustment of the mirror angle.

In a preferred embodiment, the means for attaching the hook to the brake lever stem or handgrip is a strap assembly consisting of a flexible strap having a ring attached to a first end and having a means for securing the second end of the strap. The ring is positioned adjacent the interior side of the stem or handgrip and the central portion of the strap is wrapped snugly around the exterior surface of the stem (or handgrip) and the hook. The second end of the strap is looped through the ring and secured in place by the securing means. Preferably, the securing means is Velcro hooks disposed on the exterior surface of the strap adjacent the second end which hooks attach to Velcro loops disposed on the exterior surface of the central portion of the strap.

These and other objects and features of the present invention will be better understood and appreciated from the following detailed description of certain embodiments thereof, selected for purposes of illustration and shown in the accompanying drawings.

BRIEF DESCRIPTION OF THE DRAWINGS

FIG. 1 is a perspective view of the mirror assembly of the invention attached to the stem of a bicycle brake lever on drop handlebars;

FIG. 2 is a cross-sectional view taken along section lines 2—2 in FIG. 1 of the means for removably attaching the mirror assembly to the brake lever stem;

FIG. 3 is a top plan view of the mirror assembly positioned on the brake lever stem (except for the removable attaching means);

FIG. 4 is a side view of the mirror mounting means taken along lines 4—4 in FIG. 3;

FIG. 5 is a front elevational view of the mirror assembly positioned on the brake lever stem (except for the removable attaching means);

FIG. 6 is a cross-sectional view of the mirror mounting means taken along section lines 6—6 in FIG. 4;

FIG. 7 is a perspective view of the dismantled elements of the mirror assembly.

DETAILED DESCRIPTION OF THE PREFERRED EMBODIMENTS

Figure 8:
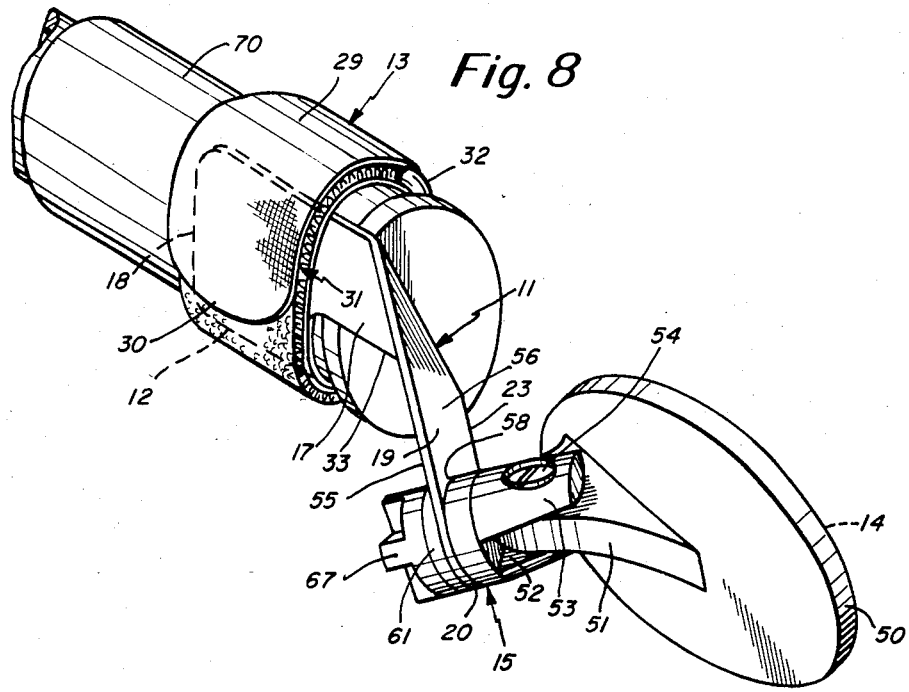
FIG. 8 is a perspective view showing the mirror assembly mounted on the handgrip of upright handlebars.

The mirror assembly 10 of the invention is shown in FIG. 1 attached to the stem 2 of a bicycle brake lever on drop handlebars 3. The mirror assembly 10 includes a rigid arm 11, a rigid hook 12, means 13 for attaching the hook to the stem, a mirror 14, and means 15 for mounting the mirror on the arm 11.

The stem 2 of each brake lever on drop handlebars 3 extends forwardly from the curved handlebar portion near each end of the handlebars. Brake lever 4 extends downwardly from the front end of stem 2. Brake cable 5 extends upwardly from a housing 6 disposed in front of stem 2.

The rigid arm 11, as shown from different angles in FIGS. 1, 3, 5, 7, and 8, is preferably bent at a junction 16 to form a first member 17 adjacent proximal end 18 and a second member 19 adjacent distal end 20. Second member 19 extends in a direction opposing hook 12. In the embodiment shown in the drawings, first member 17 and second member 19 meet at diagonal line 21 disposed at an angle α of approximately 135° with the horizontal axis 22 of frist member 17 (see FIG. 5), and top edge 23 of second member 19 is disposed at an angle β of approximately 45° with the plane of member 17 (see FIG. 3). Arm 11 may be bent at any angle which permits mirror 14 to be positioned so that a rider can view the areas behind and beside him. Preferably angle α is from about 90° to about 150° and angle β is from about 30° to about 90°.

The rigid hook 12 extends from edge 33 of arm 11 adjacent proximal end 18. Hook 12 consists of a curved surface attached at a first end 24 to edge 33 and terminating at a second end 25 adjacent the inner side 7 of stem 2. Stem 2 lies within a channel 27 defined by the interior surface 26 of hook 12 and is snugly engaged by hook 12.

The attaching means 13 for removably attaching hook 12 to stem 2 is preferably the strap assembly shown in FIGS. 1, 2, 7, and 8. The strap assembly includes a flexible strap 29 having a ring 32 connected to a first end 33 of the strap and means 31 for securing a second end 30 of the strap. Ring 32 is preferably positioned adjacent the inner side 7 of stem 2 below end 25 of hook 12. The first end 33 of the strap is secured to the lower side of ring 32 by loop 34. The central portion 38 of the strap extends from loop 34 around the bottom, outer side and top of stem 2 and around the exterior surfaces of first member 17 and hook 12. The second end 30 of the strap passes through the upper side of ring 32 and is secured to central portion 38 adjacent the outer side 35 of stem 2. Preferably, securing means 31 consists of Velcro loops 39 on the exterior surface of central portion 38 and Velcro hooks 40 on the exterior surface of strap 29 adjacent second end 30. The snug engagement of hook 12 on stem 2 and the snug engagement of strap 29 around hook 12 and stem 2 ensures that mirror assembly 10 is securely fastened to the bicycle so that the mirror will not be displaced when traveling over bumpy terrain.

For attachment to drop handlebars also having safety brake levers, hook 12 is attached to the left stem 2 by means of the screw holding the left safety lever to the stem. Hook 12 is provided with an aperture positionable over the safety lever screw hole on the inner side 7 of stem 2. Hook 12 is attached to stem 2 by unscrewing the safety lever screw, removing the safety lever, positioning hook 12 over stem 2 so that the aperture lies over the screw hole in stem 2, replacing the safety lever and screw, and tightening the screw.

Mirror 14 is mounted on arm 11 adjacent distal end 20 by mirror mounting means 15. Mirror 14 is both pivotally attached to arm 11 to allow the rider to adjust the angle of the mirror, and mirror 14 is reversibly attached to arm 11 so that it may be mounted on either of the opposing sides 55 and 56 of arm 11 to permit use of mirror assembly 10 on both drop handlebars and upright handlebars.

Mirror 14 is disposed in frame 50. Extending from the rear surface of frame 50 is neck flange 51 which is positionable in groove 52 of connecting piece 53 (see FIGS. 3, 4, and 6). A pin 54 passes through axially aligned apertures in connecting piece 53 and neck 51 to permit the mirror to pivot about the connecting piece. The angle of mirror 14 is thus adjustable to permit the rider to view different areas to the side and in back of him and to permit adjustment for riders of different heights.

The mirror mounting means 15 will first be discussed with respect to attachment of mirror assembly 10 to a brake lever stem on drop handlebars, as shown in FIGS. 1–7, wherein mirror 14 is mounted adjacent the distal side 55 of arm 11.

As shown in FIGS. 6 and 7, a square projection 57 having sides of first length $l_1$ extends from the rear face 58 of connecting piece 53. A screw 59 extends rearwardly from the center of square projection 57. A round aperture 60 of a first diameter $d_1$ is disposed in arm 11 adjacent distal end 20. First diameter $d_1$ is slightly greater than the hypotenuse h of square 57 to permit arm 11 to rotate around square projection 57. A round washer 61 has projecting from its front face a round projection 63 of second diameter $d_2$. Second diameter $d_2$ is slightly less than first diameter $d_1$ to enable projection 63 to slidably fit within aperture 60. Extending through washer 61 and round projection 63 is a square aperture 65 having sides of second length $l_2$. Second length $l_2$ is only slightly greater than first length $l_1$ to enable square aperture 65 to slidably fit without rotating around square projection 57. A nut 67 has an internal screw thread 68. Mirror 14 is mounted on distal side 55 of arm 11 by positioning round projection 63 in aperture 60 and square aperture 65 around square projection 57 and then screwing nut 67 over screw 59.

Alternatively, as shown in FIG. 8, mirror 14 can be mounted on the proximal side 56 of arm 11 for attachment to the handgrip of upright handlebars by positioning the proximal side 56 of arm 11 adjacent rear face 58 of connecting piece 53. Mirror assembly 10 is mounted on the left handgrip 70 of upright handlebars with first member 17 disposed adjacent the outer side of handgrip 70 and hook 12 extending under the bottom of handgrip 70. Strap 29 is wrapped around hook 12 and handgrip 70 with ring 32 disposed adjacent the inner side of handgrip 70 and second end 30 of strap 29 disposed adjacent the outer side of handgrip 70.

The various components of mirror assembly 10, other than mirror 14 and strap 29, should be made of a rigid material such as metal or a rigid plastic. Mirror 14 is made of reflective material. Strap 29 should be made of a flexible material such as nylon.

Although the invention has been described by reference to a preferred embodiment, many additional modifications and variations thereof will now be apparent to those skilled in the art. Accordingly, the scope of the invention is to be limited not by the details of the illustrative embodiments described herein, but only by the terms of the appended claims and their equivalents.

What is claimed is:

1. A mirror assembly for attachment to a bicycle brake lever stem on drop handlebars or a handgrip on upright handlebars, said assembly comprising:

a rigid arm having first and second sides and distal and proximal ends;

a rigid hook extending from one edge of said arm between said proximal and distal ends, said hook being disposed adjacent said proximal end and positionable around the stem of a bicycle brake lever;

a means for attaching said hook to the stem;

a mirror mounted on said arm adjacent said distal end; and a mirror mounting means for mounting said mirror on said arm, said mirror mounting means being attachable to each of the first and second sides of said arm for mounting said mirror on either of said first and second sides.

2. The assembly of claim 1 wherein said mirror is mounted adjacent the first side of said arm and said hook extends adjacent the second side of said arm for attachment of said hook over the stem of a brake lever on a bicycle having drop handlebars.

3. The assembly of claim 1 wherein said mirror is mounted adjacent the first side of said arm and said hook extends adjacent the first side of said arm for attachment of said hook under the handgrip of a bicycle having upright handlebars.

4. A quick-release mirror assembly for removable attachment to a bicycle brake lever stem on drop handlebars or a handgrip on upright handlebars, said assembly comprising:

a rigid arm having first and second sides and distal and proximal ends, said arm being bent at an angle between said ends to form a first member adjacent said proximal end and a second member adjacent said distal end;

a rigid hook extending from one edge of said arm between said proximal and distal ends, said hook being adjacent said proximal end and positionable around the stem of a bicycle brake lever;

a means for removably attaching said hook to the stem;

a mirror mounted on said arm adjacent said distal end; and a mirror mounting means for mounting said mirror on said arm, said mirror mounting means being attachable to each of the first and second sides of said arm for mounting said mirror on either of said first and second sides.

5. The assembly of claim 4 wherein said first member is positionable parallel to the axis of the stem and said second member extends in a direction away from said hook.

6. The assembly of claim 5 wherein said mirror is mounted adjacent the first side of said arm and said hook extends adjacent the second side of said arm for removable attachment of said hook over the stem of a brake lever on a bicycle having drop handlebars.

7. The assembly of claim 5 wherein said mirror is mounted adjacent the first side of said arm and said hook extends adjacent the first side of said arm for removable attachment of said hook under the handgrip of a bicycle having upright handlebars.

8. A quick-release mirror assembly for removable attachment to a bicycle brake lever stem, said assembly comprising:

a rigid arm having distal and proximal ends;

a rigid hook extending from said arm adjacent said proximal end and positionable around the stem of a bicycle brake lever;

a strap assembly for removably attaching said hook to the stem comprising a flexible strap having a ring at one end and means for securing the other end of said strap, said ring being positionable adjacent the stem and a central portion of said strap being wrapped snugly around said hook and the stem and said other end of said strap passing through said ring and being secured by said securing means;

a mirror mounted on said arm adjacent said distal end; and a means for mounting said mirror on said arm.

9. The assembly of claim 8 wherein said securing means comprises Velcro loops on the exterior surface of said central strap portion and Velcro hooks on the exterior surface of said other strap end.

10. The assembly of claim 8 wherein said ring is positionable adjacent the inner side of the stem and said other strap end is secured to said central strap portion adjacent the outer side of the stem.

11. A quick-release mirror assembly positionable on both a bicycle brake lever stem on drop handlebars and a handgrip on upright handlebars, said assembly comprising:

a rigid arm having first and second sides and distal and proximal ends, said arm being bent at an angle between said ends to form a first member adjacent said proximal end and a second member adjacent said distal end;

a rigid hook extending from one edge of said arm between said proximal and distal ends, said hook being adjacent said proximal end and positionable around the stem of a bicycle brake lever;

a strap assembly for removably attaching said hook to the stem comprising a flexible strap having a ring at one end and means for securing the other end of said strap, said ring being positionable adjacent the stem and a central portion of said strap being wrapped snugly around said hook and the stem, and said other strap end passing through said ring and being secured by said securing means;

a mirror mounted on said arm adjacent said distal end; and a mirror mounting means for mounting said mirror on said arm, said mirror mounting means being attachable to each of the first and second sides of said arm for mounting said mirror on either of said first and second sides.

12. The assembly of claim 11 wherein said mirror mounting means includes means for allowing said mirror to pivot about said arm.

13. The assembly of claim 12 wherein said securing means comprises Velcro loops on the exterior surface of said central strap portion and Velcro hooks on the exterior surface of said other strap end.

14. The assembly of claim 13 wherein said ring is positionable adjacent the inner side of the stem and said other strap end is secured to said central strap portion adjacent the outer side of the stem.

15. The assembly of claim 14 wherein said mirror is mounted adjacent the first side of said arm and said hook extends adjacent the second side of said arm for removable attachment of said hook over the stem of a brake lever on a bicycle having drop handlebars.

16. The assembly of claim 13 wherein said mirror is mounted adjacent the first side of said arm and said hook extends adjacent the first side of said arm for removable attachment of said hook under the handgrip of a bicycle having upright handlebars.

* * * * *